Dec. 13, 1960 J. A. FREER ET AL 2,963,947

DEVICES FOR HIGH SPEED PRINTING

Filed Feb. 25, 1958 3 Sheets-Sheet 1

Inventors
John Anthony Freer
Gordon George Scarrott
By
Cameron, Kerkam & Sutton
Attorneys Inventors
John Anthony Freer
Gordon George Scarrott
By
Cameron, Kerkam & Sutton
Attorneys Dec. 13, 1960 J. A. FREER ET AL 2,963,947

DEVICES FOR HIGH SPEED PRINTING

Filed Feb. 25, 1958

3 Sheets-Sheet 3

John Anthony Freer
Gordon George Scarrott
Inventors
By
Cameron, Kerkam & Sutton
Attorneys

United States Patent Office 2,963,947

Patented Dec. 13, 1960

2,963,947

DEVICES FOR HIGH SPEED PRINTING

John Anthony Freer, Poynton, and Gordon George Scarrott, Manchester, England, assignors to Ferranti, Limited, Hollinwood, Lancashire, England, a company of Great Britain Filed Feb. 25, 1958, Ser. No. 717,365

Claims priority, application Great Britain Mar. 1, 1957

9 Claims. (Cl. 95—4.5)

This invention relates to devices for the high speed printing of characters (hereinafter called "printers") and has particular application to electric computers and business machines and will be described in that connection. It should be understood however that the invention is by no means limited to such applications.

Previous high speed printers have generally been characterised by mechanical printing and intermittently moving mechanisms and the speed attainable has been limited by the inertia of mechanical parts.

It is an object of the present invention to provide a printer in which the selection and printing of characters is performed electrically and optically and in which there are no intermittently moving mechanisms.

Such a printer, in which all the mechanical parts operate with a continuous steady motion, is capable of a much higher operating speed than apparatus having intermittently moving mechanisms.

In accordance with the invention a printer for producing a record in $n$ different characters arranged in lines of $p$ characters per line includes a transparent drum having opaque characters aligned in $n$ rows parallel to the drum axis and $p$ bands normal to said axis, each band containing all the said $n$ different characters, a row of $p$ light sources, means for continuously rotating the drum to bring the $p$ characters in any one row into optical registration each to each with the $p$ light sources, selecting means for energizing one or more of said light sources simultaneously in accordance with the positions of said characters to be recorded in any given line of the record, means for projecting onto a continuously moving light-sensitive surface an image of each selected character in a row as that character is illuminated during the optical registration of the characters in that row with the sources, deflecting means for moving any such images in the same direction and at the same speed as the light-sensitive surface, and optical means for counteracting movement of the characters as the drum rotates.

Said optical means may include for each of said rows of characters a cylindrically concave portion of the surface of the drum extending parallel to and diametrically opposite that row, in which case said projection means may include for each character position a convex spherical lens to focus the image of the selected character in that character position onto the sensitive surface, the focal length of each spherical lens being in excess of the distance of the lens from the concave portion of the drum diametrically opposite the selected character, and a cylindrically convex lens to correct for astigmatism caused by that concave portion.

Said deflecting means may comprise a block of refracting transparent material interposed in the path of the light from said projecting means to said sensitive surface, and means for rotating the block about an axis of the block parallel to the lines of the record at such a speed relative to the speed of rotation of the drum as to cause all the images projected during a complete rotation of the drum to fall on a single line of the record.

Said selecting means may include a storage means for storing in respect of each line of the record to be printed information representing for each of the $p$ character positions in that line the one of the $n$ characters, if any, to be printed in that position, decoding means for deriving such information from electrical signals representing successively the characters to be printed in that line and for storing in the store the information so derived, and output means for converting such stored information into electrical signals to operate said light sources in synchronism with the rotation of the drum to print that line.

Reference will now be made to the accompanying drawings in which.

Figure 1:
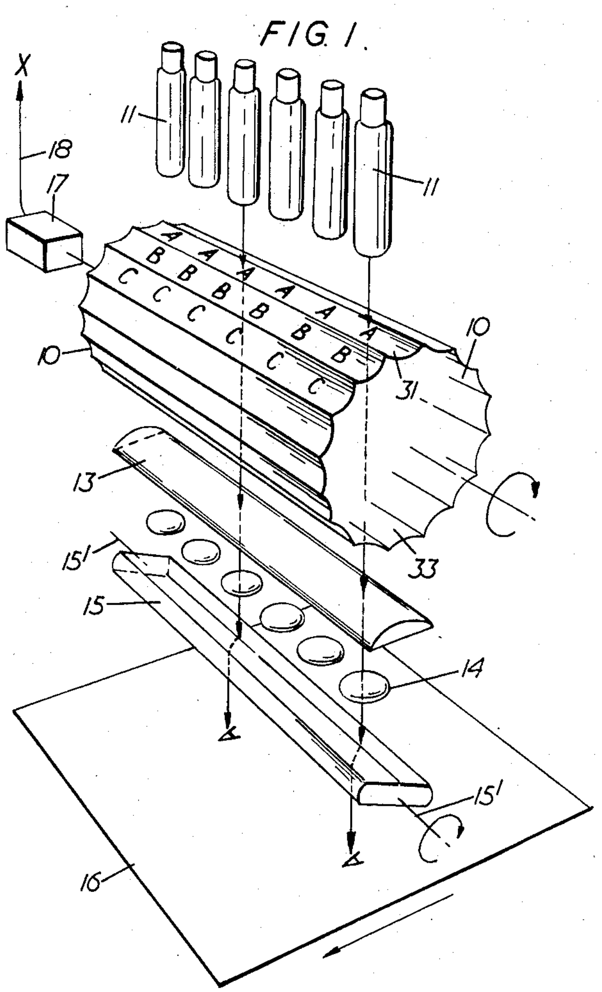
Figures 1 and 4 illustrate schematically the optical parts of one form of printer in accordance with the invention.

Referring now particularly to Figure 1, in carrying the invention into effect in accordance with the form shown in the drawings, and by way of example, a printer for printing lines containing 70 character positions includes a drum 10 made of transparent material and arranged to rotate in the direction of the arrow. Extending across the surface of the drum parallel to its axis and hence parallel to one another are a number of concave strips of equal arc. One such strip is provided for each letter to be printed and each strip bears as many representations of a character as there are character positions in a line of print. Thus, corresponding to each character position in a line of print there is a band round the surface of the drum normal to its axis containing all the required characters in order. The characters are opaque. In Figure 1, for clarity, only six A's, B's and C's are shown on the drum, and the drum has 16 strips. In the actual embodiment 70 A's are provided in the "A" strip, 70 B's in the "B" strip and so on, and there are 40 strips on the drum. Associated with every character position in a line is a separate light source 11. In this way each light source 11 may, when lit, illuminate any character in a band of characters. The light sources are of the kind which produce a short duration flash of high intensity.

The optical system is completed by a cylindrical lens 13 extending the axial length of the drum 10 and hence common to all the character positions, and spherical lenses 14 (six only of which are shown), one of which is provided for each character position. A glass block 15, of the axial length of the drum 10, is positioned as shown in the figure and rotates around its longer axis $15^1$ in the direction of the arrow. A strip of light-sensitive material 16 (hereinafter called "the paper"), located as shown in the figure, moves in the direction of the arrow.

Synchronising means 17, driven by the drum 10, and connected by line 18 with a point X, is provided for a purpose which will be described hereafter.

Figure 2:
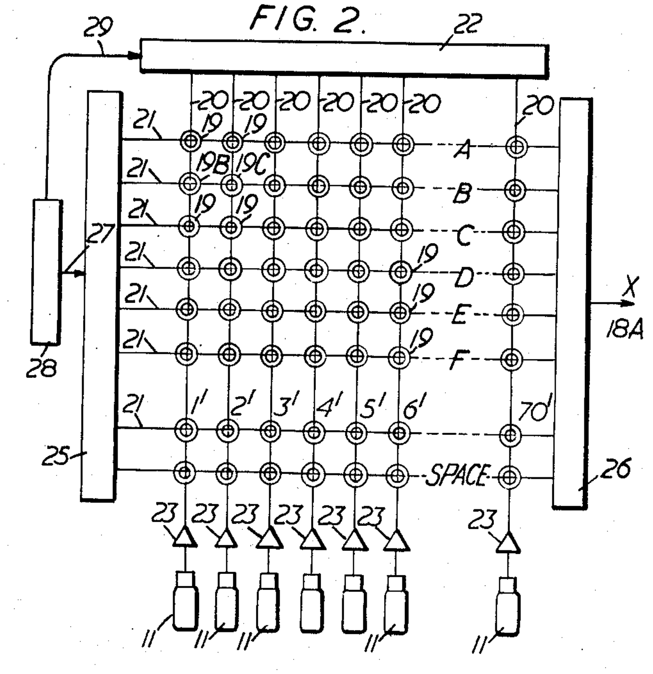
Figure 2 is a diagram to illustrate the operation of a storage system.

Associated with the optical equipment is a storage device comprising a matrix of magnetic cores (see Fig. 2) arranged in the usual array of rows and columns and each of a material having a substantially square hysteresis loop. A number of such cores are shown in Figure 2, some bearing reference 19. As shown in Figure 2, there are as many rows of cores as there are different characters to be printed (and hence as there are rows of characters on the drum) and as many columns as there are character positions in a line of print. To simplify the drawing some cores are represented by dotted lines, but in the embodiment being described there are 70 columns and 40 rows. Each core is threaded by two wires 20 and 21, the wires 20 being connected to a column decoder 22 and each through an amplifier 23 to a flash tube 11 so that there is a separate amplifier and flash tube for every column, corresponding to a character position in a line of print.

In the figure the wires 21 have been given references (A, B, C . . . ) corresponding to the characters which they represent and wires 20 references ($1^1$, $2^1$, $3^1$ . . . $70^1$) corresponding to the position in a line of print of the flash tube 11 with which they are associated. There are, therefore, 70 amplifiers 23 and 70 flash tubes 11.

Wires 21 are each connected with a character decoder 25 and a drum position decoder 26. Drum position decoder 26 is connected also by way of line 18A with the point X previously referred to. Character decoder 25 is connected by line 27 with a tape reader 28, which is also connected by line 29 with column decoder 22.

The apparatus operates in two cycles which will be described later in detail. In this description it is assumed that the data representing characters is stored upon a magnetic tape in blocks representing lines of print, in the order in which the characters are to be printed in a line. In the first of the two cycles above referred to the transfer of the said data from the tape to the magnetic store is effected and in the second cycle the characters are printed from the store. As shown diagrammatically in Figure 3 the first cycle occupies two revolutions of the drum while the second or printing cycle occupies one revolution of the drum.

Figure 4:
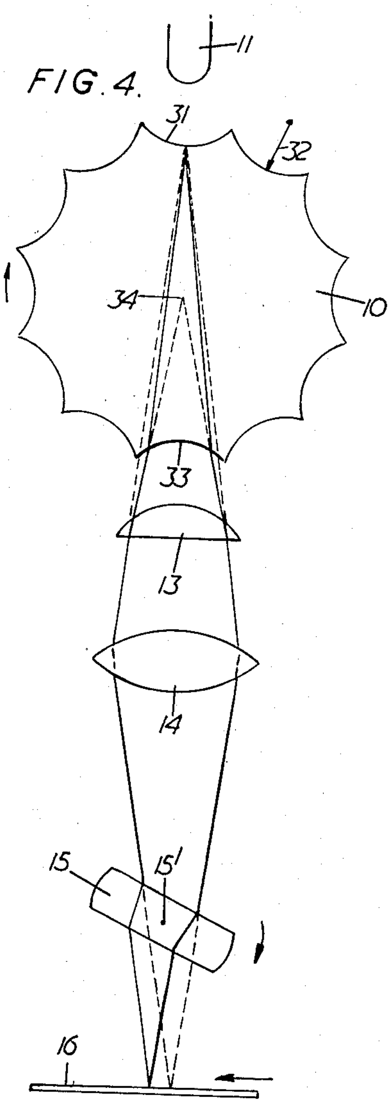

The operation of the optical system will be described first with reference to Figure 1. Reference will also be made to Figure 4, which shows the arrangement of Figure 1 in section with the number of concave strips on the drum reduced still further to clarify the description of the optical functioning of the system. The drum and the refracting block 15 are arranged to rotate, the drum at six times the speed of the block. Because the drum is continually in motion the characters on it move a small amount during the time that they are illuminated by a flash from a light source. The optical system is designed to produce sharp images of the characters on the paper 16 notwithstanding this movement of the character. When a light source 11 flashes, an object is presented to the optical system which object comprises the light source in question, partly obscured by the opaque character on the row 31 (see Fig. 4) of the drum nearest to the light source. The radius of curvature 32 of this and the other concave cylindrical surfaces on the drum is chosen so that the concave surface 33 of the drum diametrically opposite row 31 refracts any ray of light originating at the object by an amount which makes the ray appear to come from a virtual image at the axis 34 of rotation of the drum. The characters carried by surface 31, and surface 33 itself, may be described as being in optical registration with the light sources, since they lie in the optical path between the sources and the paper.

During part of the rotation of the drum the object is displaced, but in the same time the image at axis 34 only rotates through the same angle as the drum, so that the image is slightly foreshortened, and will suffer negligible blurring due to the movement of the original object.

Because the concave surfaces form cylindrical lenses the virtual image produced by concave surface 33 is reduced in height but not in width; that is to say, there is astigmatism. The curvature of surface 33 in the radial plane produces a virtual image at the axis 34 of the drum as described, but in the axial plane there is no curvature of surface 33 so that the image is nearer to the object. Such astigmatism would not allow an image of the character to be focused on the paper if the cylindrical lens 13 were not provided. This lens has a radius of curvature chosen to remove the astigmatism. For convenience, this lens extends over the axial length of the drum so as to be common to each character position, but it obviously acts in operation as if each character position were provided with a cylindrical lens individual to it.

In order to project a real image of the character on to the paper convex spherical lenses 14 are placed as shown in Figure 1. One such lens is required for each character position. The focal length of the spherical lenses 14 is chosen so that the images on the paper are correctly focussed when the lenses 14 are close to the rotating drum and this arrangement ensures that the focal planes of the spherical lenses are some distance from the operative concave surface 33 of the drum, so that the opaque characters on surface 33, which are also in optical registration with the light sources, have no effect upon the projection of the correct characters—those on surface 31—other than to reduce by a small amount the quantity of light passing through the system.

It will now be apparent that by flashing light sources 11, characters may be projected onto the paper, and that if more than one light-source is flashed, when, say, the "A" characters are in optical registration nearest the light sources, a number of "A's" will be projected on the paper, in line, and that by flashing only selected light sources "A's" may be printed in any position where an "A" is required in a line of print. By the time, however, that the drum has moved into a position in which "B's" may be printed, the paper will have moved a small amount, and in the absence of deflecting means any "B's" printed would appear in a lower position than the "A's." It is arranged therefore to move the images in the same direction and at the same speed as the paper and for this purpose a rectangular transparent block 15 is used as shown in Figure 1.

It is found that the displacement of a ray of light passing through such a block as 15 is a substantially linear function of the angle of incidence over a range of ±30 degrees from the normal. The block is therefore made to rotate about axis $15^1$ at one sixth the speed of the drum so that its linear range of 60 degrees is traversed as the drum completes one revolution, and during this time the paper is moved one third of the line feed distance. All characters printed during one revolution of the drum will therefore fall on a single line of the record. In the ensuing two revolutions of the drum whilst the data for the next line is being stored and the printing part of the apparatus is inoperative the block turns through 120 degrees ready to begin its other linear range. Since the paper moves through one third of the line feed distance in each cycle of the printer the thickness of the block is chosen so that the displacement produced by its 60 degree rotation during each cycle is equal to one third of the line feed distance.

Referring now to Figure 2, as has already been explained each of the cores 19 is threaded by two wires 20 and 21. Each core is made from a material having a substantially square hysteresis loop, such that any flux linking the core from the wires 20 or 21 will have no permanent effect upon the magnetization of the core so long as it is not greater than one half of the flux required to saturate the core. Thus any core can be magnetized, without affecting the remaining cores, by passing a current to produce half the saturation flux down both wires threading it. A core may be magnetized in two directions corresponding to the upper and lower extremities of the hysteresis loop. For the purposes of this description a core magnetized in one direction will be referred to as "set" and in the other as "re-set." It will be appreciated that which directions correspond to "set" and "re-set" are of no moment as long as it is remembered that the one is the opposite of the other. A core will be referred to as "set" if it is magnetized in the direction which will cause a character to be printed, and as "reset" when it is magnetized in the opposite direction. By setting cores in this way information may be stored in a matrix and this information may be read from a core by passing a current down one wire to produce the full saturation flux in the core in the direction opposite to the set direction. If the core has been previously set a large flux change will occur in the core and an output pulse will be induced in the other wire. If the core has not previously been set a negligible flux change will occur in the core and a negligible output pulse will occur in the other wire.

Storage of information in such a way is now well known in the computer art. For a more detailed description of the operation of a magnetic core store the reader is referred for example to a paper by Robinson and others published in volume 103, part B of the Proceedings of the Institution of Electrical Engineers, entitled "A Digital Store Using a Magnetic Core Matrix."

Figure 3:
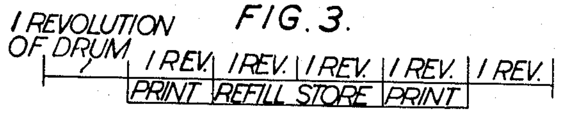
Figure 3 is an explanatory timing diagram.

The input signals appear consecutively on the tape, from which they are read by tape reader 28, and passed by line 27 to character decoder 25. At the same time a pulse for each character is passed from the tape reader by way of line 29 to column decoder 22. The character decoder 25 passes a pulse to whichever wire 21 corresponds with the character represented by the input signal. At the same time the pulse by way of line 29 operates the column decoder, which is a counter, to pass a pulse to one of the wires 20 corresponding with the position of the character represented by the input signal in the line of print. Thus the reading of the first character in a line (say a "B") from the tape will cause the character decoder to energise wire 21 corresponding to "B" while the column decoder will energise wire 20 corresponding to the first position in a line of print. Core $19^B$ will therefore be pulsed by both its 20 and its 21 wires and will be set. No other core will receive a pulse from more than one wire and no appreciable change in magnetic state will occur in any other core. When the second character (say a "C") is read from the tape the character decoder will energise wire 21 corresponding to "C" and at the same time the column decoder will energise wire 20 corresponding to the second position in the line of print and core $19^C$ will be set. When the complete line of print has been read from the tape one core in each column corresponding with the character to be printed will be set. It will be appreciated that more than one core in each row may be set because there may be more than one such character in a line of print. Similarly some rows may not contain a set core at all. At the end of this operation the store contains all the information required to specify a line of print and it receives this information during two revolutions of the drum 10, as shown in Figure 3, during which time the paper moves on two-thirds of the line feed distance. For the next revolution of the drum 10 the tape reader 28, character decoder 27 and column decoder 22 are all rendered inoperative while the drum position decoder 26 (to which the wires 21 are connected) receives signals from synchronising means 17 which cause it to count down one wire 21 as each corresponding strip of characters on the drum 10 passes the light sources 11, thereby coming into optical registration with them, and at the same time to energise the corresponding wire 21 with a pulse sufficient to reset the cores. This pulse resets all the set cores in the row and in doing so produces a pulse in each wire 20 where the corresponding character has been stored. These pulses in wires 20 are amplified in amplifiers 23 and cause the corresponding light sources 11 to flash. In this way as each character strip on drum 10 passes the light sources the lights are flashed on in each column where the character on the strip is required to be printed, and a line of print is "built up" by printing first the "A's" then the "B's," "C's" and so on through the alphabet, numerals and punctuation marks. At the end of this cycle of operation all the cores in the store have been reset and the store is ready to receive a fresh line of print from the tape. Drum position decoder 26, amplifiers 23, and light sources 11 are all rendered inoperative during the time in which store is being refilled.

The above-described apparatus may be varied within the scope of the invention. For example the input to the printer may be derived from punched cards, or from perforated tape, or the printer may be operated directly from the output of a computer. While the optical system described is satisfactory, modification and different arrangements of the parts will be apparent. Where for instance a slight distortion of the print may be tolerated the transparent block 15 need only be rotated at one quarter of the drum speed, since the displacement of a light ray passing through the block does not in practice greatly depart from a linear relationship with respect to the angle of incidence over a range of ±45 degrees from the normal. Instead of there being a spherical lens 14 for each character position, one such lens may be provided for all the character positions in common, provided that the diameter of the lens is suitably increased and its focal length appropriately modified.

The tape reader and the character, column, and drum position decoders are constructed from circuits which are well known to those familiar with the art.

It is not essential that each row of aligned characters should contain the same character repeated $p$ times, though this is usually the most convenient arrangement. Instead, the characters may be located anywhere in the aligned array of rows and bands provided that each band contains all the $n$ characters. Where the printer is actuated by a storage device of the kind described with reference to Fig. 2 it will of course be necessary to modify correspondingly the allocation of characters to cores in the matrix.

What we claim is:

1. A printer for producing a record in $n$ different characters arranged in lines of $p$ character positions per line including a transparent drum having opaque characters aligned in $n$ rows parallel to the drum axis and $p$ bands normal to said axis, each band containing all the said $n$ different characters, a row of $p$ light sources positioned externally of said drum and extending parallel to the drum axis, means for continuously rotating the drum to bring the $p$ characters in any one row into optical registration each to each with the $p$ light sources, selecting means for energising one or more of said light sources simultaneously in accordance with the positions of said characters to be recorded in any given line of the record, means for projecting onto a continuously moving light-sensitive surface positioned on the opposite side of said drum from said light sources an image of each selected character in a row as that character is illuminated during the optical registration of the characters in that row with the sources, deflecting means for moving any such images in the same direction and at the same speed as the light-sensitive surface, and optical means for counteracting movement of the characters as the drum rotates.

2. A printer as claimed in claim 1 wherein said optical means includes for each of said rows of characters a cylindrically concave portion of the surface of the drum extending parallel to and diametrically opposite the row.

3. A printer as claimed in claim 2 wherein said projecting means includes for each character position a convex spherical lens to focus the image of the selected character in that character position onto the sensitive surface, the focal length of each spherical lens being in excess of the distance of the lens from the concave portion of the drum diametrically opposite the selected character, and a cylindrically convex lens to correct for astigmatism caused by that concave portion.

4. A printer as claimed in claim 3 wherein a said convex lens is common to at least two of said character positions.

5. A printer as claimed in claim 1 wherein said deflecting means comprises a block of defracting transparent material interposed in the path of the light from said projecting means to said sensitive surface, and means for rotating the block about an axis of the block parallel to the lines of the record at such a speed relative to the speed of rotation of the drum as to cause all the images projected during a complete rotation of the drum to fall on a single line of the record.

6. A printer as claimed in claim 1 wherein said selecting means includes a store for storing in respect of each line of the record to be printed information representing for each of the $p$ character positions in that line the one of the $n$ characters, if any, to be printed in that position, decoding means for deriving such information from electrical signals representing successively the characters to be printed in that line and for storing in the store the information so derived, and output means for converting such stored information into electrical signals to operate said light sources in synchronism with the rotation of the drum to print that line.

7. A printer as claimed in claim 6 wherein said store is in the form of a matrix of magnetic cores arranged in $p$ columns respectively representing the different character positions and $n$ rows respectively representing the different character.

8. A printer for producing a record in $n$ different characters arranged in lines of $p$ character positions per line including a rotatable drum having $n$ cylindrically concave transparent portions forming cylindrical lenses extending parallel to the drum axis and $n$ rows of $p$ opaque characters each so arranged that each row is parallel to one of said cylindrically concave transparent portions and in radial alignment therewith with respect to the drum axis, said characters being aligned in $p$ bands normal to said axis with each band containing all of said $n$ different characters, a row of $p$ light sources located externally of said drum extending parallel to the drum axis and so arranged that each light source is in alignment with one of said bands of characters, means for continuously rotating the drum to bring the $p$ characters in any one row and the radially aligned cylindrically concave transparent portion into optical registration with the $p$ light sources, selecting means for energising one or more of said light sources simultaneously in accordance with the positions of said characters to be recorded in any given line of the record, means for projecting onto a continuously moving light-sensitive surface located externally of said drum at a position remote from said light sources an image of each selected character in a row as that character is illuminated during the optical registration of the characters in that row with the sources, and means for moving any such images in the same direction and at substantially the same speed as the light-sensitive surface.

9. A printer as claimed in claim 8 wherein the light-sensitive surface is located on the opposite side of the drum from said light sources and each of the cylindrically concave transparent portions of said drum is poistioned diametrically opposite another of said portions.

References Cited in the file of this patent

UNITED STATES PATENTS

| | | |
|---|---|---|
| 2,343,397 | Bryce | Mar. 7, 1944 |
| 2,364,188 | Bryce | Dec. 5, 1944 |
| 2,464,139 | Luboshez | Mar. 8, 1949 |
| 2,769,367 | Schwesinger | Nov. 6, 1956 |